Dec. 27, 1966    M. R. VENNETT    3,293,837
METHOD AND APPARATUS FOR MAKING WIRE ROPE
Filed July 24, 1964    2 Sheets-Sheet 1
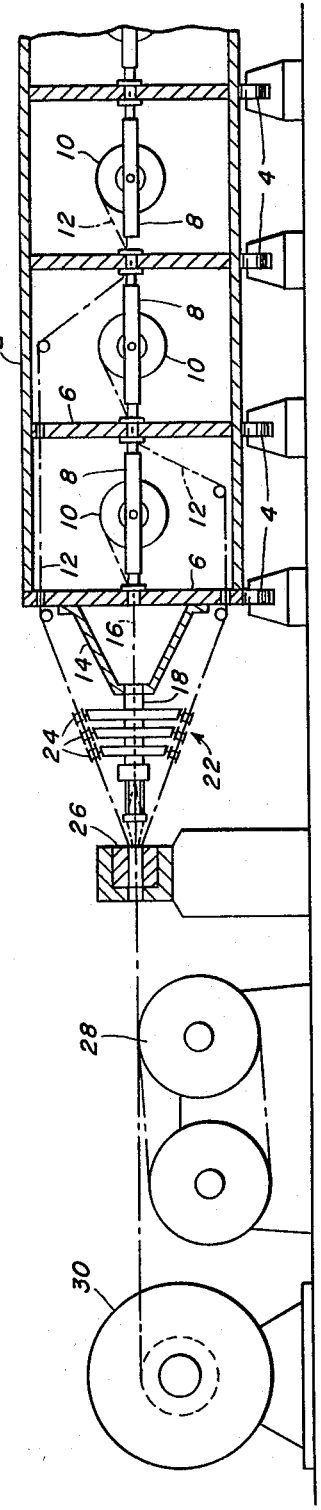
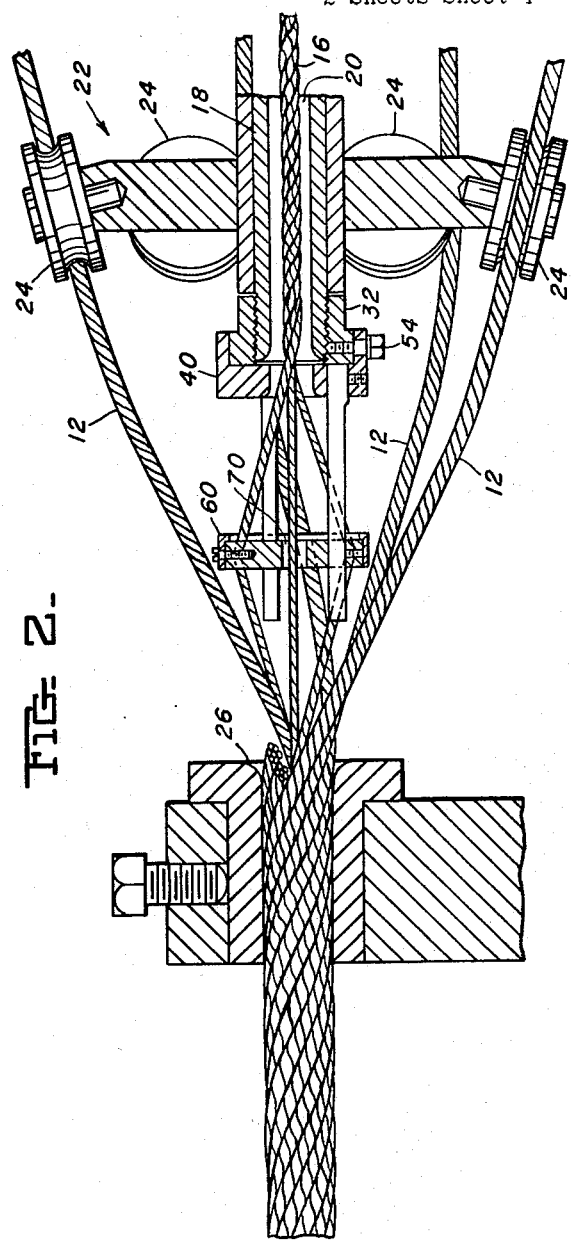
INVENTOR.
MICHAEL R. VENNETT
By Donald G. Dalton
Attorney

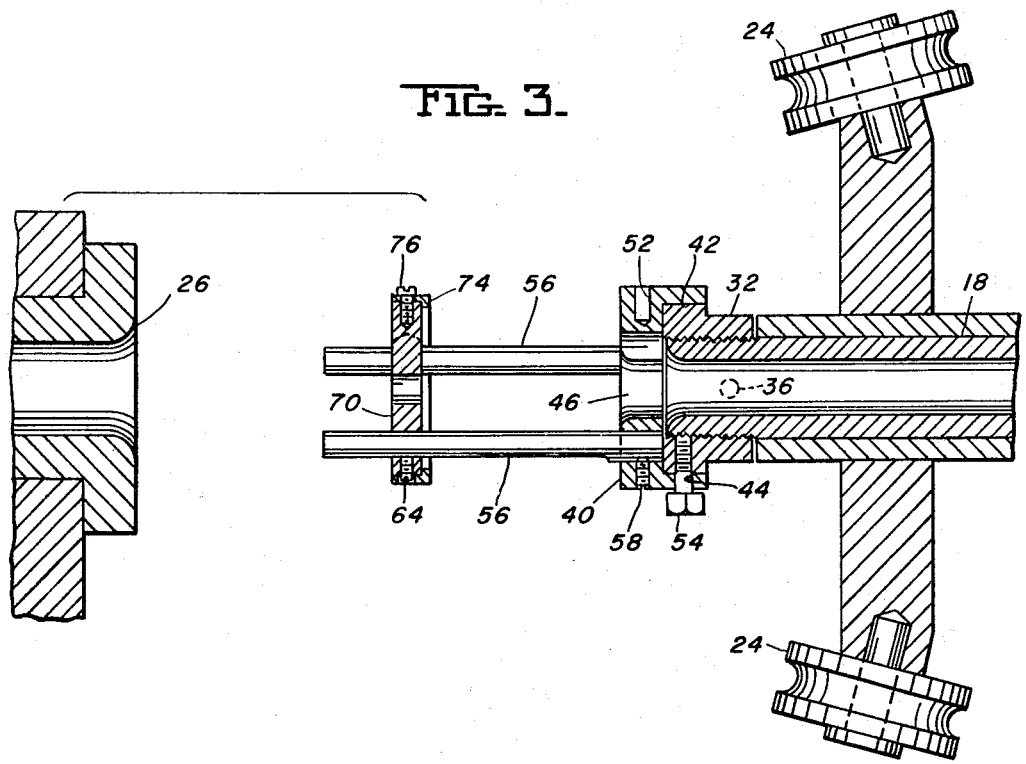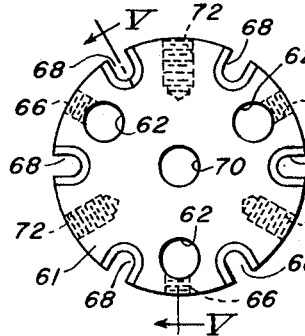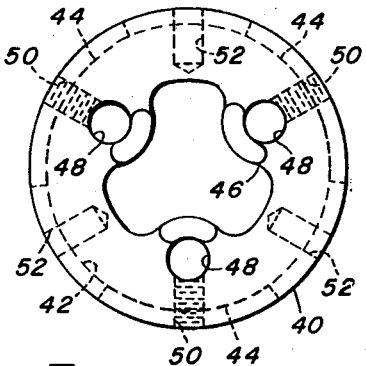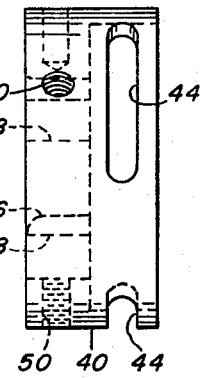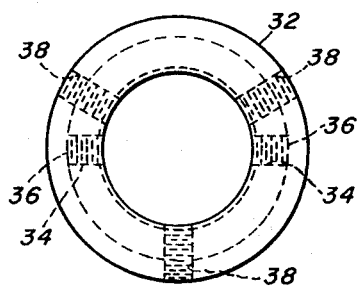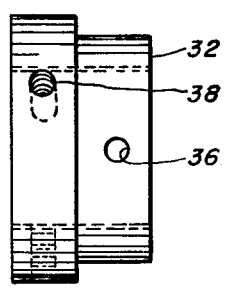
INVENTOR.
MICHAEL R. VENNETT
By Donald G. Dalton
Attorney

United States Patent Office 3,293,837
Patented Dec. 27, 1966

3,293,837
METHOD AND APPARATUS FOR MAKING WIRE ROPE
Michael R. Vennett, Guilford, Conn., assignor to United States Steel Corporation, a corporation of Delaware
Filed July 24, 1964, Ser. No. 384,878
7 Claims. (Cl. 57—13)

This invention relates to a method and apparatus for making wire rope and more particularly to the making of steel ropes having an independent wire rope core. For best construction the lay of the independent wire rope core should match that of the finished rope with the outer strands of the rope lying in the valleys between the strands of the independent wire rope core. This may be done by stranding the entire rope in a single operation. This method requires a machine which will accommodate in one loading the strands of the independent wire rope core and the outer strands of the rope. Such machines are large and expensive. A second method of making the rope consists of first making the independent wire rope core with a lay equal to that desired in the finished rope. The outer strands of the rope are then closed around this core in a separate operation with the speed of the haul off drum and the closing machine being adjusted to accommodate for variation when the lay produced by the closing machine did not exactly coincide with that of the previously manufactured independent wire rope core. This method does not work satisfactorily because of the necessity of making numerous adjustments in the speed of the haul off drum and in many instances the lay produced by the closing machine does not exactly coincide with that of the independent wire rope core.

It is therefore an object of my invention to provide a method for producing a wire rope having an independent wire rope core in which little difficulty is encountered in matching the lay of the independent wire rope core and that of the finished rope and in which the independent wire rope core is formed prior to stranding the outer strands around the core.

Another object is to provide a machine which will strand outer strands around a previously formed independent wire rope core in which the lay of the independent wire rope core matches that of the finished rope.

These and other objects will be more apparent after referring to the following specification and attached drawings, in which:

FIGURE 1 is a longitudinal elevation, partly in section, of the apparatus of my invention;

FIGURE 2 is an enlarged longitudinal vertical section of the apparatus of FIGURE 1 showing a wire rope being formed;

FIGURE 3 is a view, similar to FIGURE 2, showing the equipment without the rope therein;

FIGURE 4 is an end view of the auxiliary twister head of my invention;

FIGURE 5 is a view taken on the line V—V of FIGURE 4;

FIGURE 6 is an end view of the holder for the auxiliary twister head;

FIGURE 7 is a side view of the holder of FIGURE 6;

FIGURE 8 is an end view of a nut used with the holder of FIGURE 6; and

FIGURE 9 is a side view of the nut of FIGURE 8.

Referring more particularly to the drawings, reference numeral 2 indicates a rotatable tubular member which is supported horizontally in any suitable manner such as by sets of rollers 4 positioned along its length. Equally spaced along the length of the tube 2 are transverse spiders 6 between which are supported axially pivoted cradles 8. Supply spools 10 are rotatably mounted in the cradles 8. Strands 12 are reeled on the supply spools 10 except for the one on the left as seen in FIGURE 1. A hollow mast 14 is mounted axially on one end of the tube 2 and an independent wire rope core 16 passes therethrough from the left hand spool 10. A shaft 18 having an axial hole 20 therethrough is mounted on the mast 14 and supports a preforming twister head 22 which includes a plurality of pulleys 24 one for each strand 12. A closing head 26 is axially aligned with the shaft 18 on the exit side thereof. Haul off mechanism 28 and storage reel 30 are arranged on the exit side of closing die 26. The parts so far described are conventional and may vary somewhat from that shown without changing the operation as hereinafter described. Carleton Patent No. 2,556,164, dated June 12, 1951; Gregson Patent No. 1,809,032, dated June 9, 1931; Ramstedt Patent No. 2,411,291, dated November 19, 1946, and Carleton et al. Patent No. 2,724,944, dated November 29, 1955, disclose various types of stranding machines with which my invention may be used.

According to my invention an L-shaped nut 32 is threaded on the end of shaft 18. As best shown in FIGURES 8 and 9 the nut 32 has a pair of tapped holes 34 therethrough so that it can be held in adjusted position by means of set screws 36 threaded into the holes 34 against the shaft 18. The nut 32 also has three threaded holes 38 through the wall thereof spaced axially from the holes 34. A holder 40 is secured to the nut 32. As best shown in FIGURES 6 and 7 the holder 40 has a cylindrical bore 42 at one end thereof which snugly receives the nut 32. Three slots 44 pass through the wall of the holder 40 into the bore 42 and are equally spaced around the periphery thereof. An axial opening 46 extends from the bore 42 to the exit end of the holder 40. Three round holes 48 extend through the holder 40 parallel to its axis with their centers at equal distance from the axis. A threaded radial hole 50 extends from the outside of the holder 40 to each of the holes 48. Three equally spaced holes 52 extend radially inwardly from the outside of the holder 40 for a purpose which will appear later. The holder 40 is secured to the nut 32 by means of three capscrews 54. Each of the capscrews 54 passes through one of the slots 44 into the associated threaded hole 38 in the nut 32. The capscrews 54 prevent the holder 40 from turning with respect to the nut 32 by frictional force.

Three rods 56 are secured to the holder 40, one in each of the holes 48. A set screw 58 is threaded into each of the holes 50 against the associated rod 56. An auxiliary twister head 60 including a plate like member 61 is secured to the outboard ends of the rods 56. For this purpose the member 61 is provided with three holes 62 therethrough for receiving the rods 56. Set screws 64 are threaded into radial holes 66 which communicate with the holes 62. The member 61 has a plurality of hardended and polished grooves 68 equally spaced around its periphery. The member 61 also has an axial hole 70 therethrough and three threaded radial holes 72 therein equally spaced around the periphery thereof. A cap 74 is secured to the member 61 by means of set screws 76 threaded into the holes 72. Thus the grooves 68 are closed by means of the cap 74.

In making a rope, such as a 6 by 41 wire rope with a 7 by 7 independent wire rope core, there will be six strands 12 received one on each supply spool 10. The independent wire rope core 16 will be formed in the usual manner. This may be done on apparatus such as shown in FIGURE 1 without using the auxilary twister head. The independent wire rope core is fed through the mast 14 from its supply reel 10. The lay of the independent wire rope core is the same as the lay of the finished rope. The strands at the leading end of the independent wire rope core are unlaid for a short distance and threaded through the twister head 60, one in each of the grooves 68 with the center strand passing through the hole 70. The strands are then attached to a completed rope on the capstans 28 or may be fed around the capstans 28 and attached to the reel 30. The main rope strands 12 are strung up through the main twister head 22 and attached to the trailing end of the completed rope in the same manner as the strands of the independent wire rope core. The holder 40 may be adjusted to align the core strands with the approach angle of the outer strands by loosening the capscrews 54 and inserting a pin into one of the holes 52 so as to rotate the holder about its axis. Once adjusted, the capscrews 54 are tightened to secure the holder 44 in adjusted position. The machine is then started in operation with the strands of the independent wire rope core 16 and the outer strands 12 of the rope being twisted up at a common point in the mouth of the closing die 26 around the core of the independent wire rope core. The head 60 which is twisting up the strands of the independent wire rope core at a common point of twist with the outer strands of the rope is also untwisting the strands of the independent wire rope core adjacent the holder 40. The strands 12 will be laid up in the valleys between the strands of the independent wire rope core 16. It will be understood that various types of ropes may be made in this manner and that the number of slots 68 may be varied if the number of strands in the independent wire rope core are varied and that the number of strands 12 may be varied if desired.

While one embodiment of my invention has been shown and described it will be apparent that other modifications and adaptations may be made without departing from the scope of the following claims.

I claim:

1. Apparatus for making a wire rope having an independent wire rope core, including a plurality of strands surrounding a core, and a plurality of outer strands surrounding the independent wire rope core, which apparatus comprises a rotatable member, a plurality of rotatable spools one for each of said outer strands mounted on said rotatable member, a closing die spaced from one end of said rotatable member in axial alignment therewith, a main twister head for said outer strands between said rotatable member and said closing die, means for rotating said main twister head with said rotatable member, an auxiliary twister head adjacent the entry end of said closing die, means for rotating said auxiliary twister head at the same angular velocity as said main twister head, means for guiding said independent wire rope core to the entry end of said auxiliary twister head, said independent wire rope core strands being separated by said auxiliary twister head, said rotatable member and said main twister head having axial openings through which said independent wire rope core passes, said auxiliary twister head having an axial opening through which the core of said independent wire rope core passes, said outer strands and said strands of said independent wire rope core being stranded around the core of said independent wire rope core in said closing die, and means for pulling said core and all of said strands through said closing die.

2. Apparatus for making a wire rope having an independent wire rope core, including a plurality of strands surrounding a core, and a plurality of outer strands surrounding the independent wire rope core, which apparatus comprises a rotatable member, a plurality of rotatable spools one for each of said outer strands mounted on said rotatable member, a closing die spaced from one end of said rotatable member in axial alignment therewith, a staff mounted on the end of said rotatable member adjacent said closing die for rotation therewith and having an axial opening therethrough, a hollow shaft mounted on said staff for rotation therewith and in axial alignment therewith, a main twister head for said outer strands mounted on said shaft for rotation therewith, an auxiliary twister head adjacent the entry end of said closing die, means mounting said auxiliary twister head on said shaft for rotation therewith, means for guiding said independent wire rope core to the entry end of said auxiliary twister head, said independent wire rope core strands being separated by said auxiliary twister head, said auxiliary twister head having an axial opening through which the core of said independent wire rope core passes, said outer strands and said strands of said independent wire rope core being stranded around the core of said independent wire rope core in said closing die, and means for pulling said core and all of said strands through said closing die.

3. Apparatus according to claim 2 in which said auxiliary twister head includes a plate like member having an axial hole therethrough and a plurality of equally spaced grooves around its periphery one for each of the strands of the independent wire rope core, and a cap fastened to said plate like member with a portion thereof extending over the outer periphery of said plate like member to close said grooves.

4. Apparatus according to claim 3 in which said means for mounting said auxiliary twister head on said shaft includes a holder fastened to the end of said shaft adjacent said auxiliary twister head, said holder having a plurality of holes therein parallel to the axis thereof, said plate like member having a plurality of holes therein parallel to the axis thereof aligned with the holes in said holder, a plurality of bars extending between said holder and plate like member with the ends thereof being received in said aligned holes, and means securing said bars to said holder and plate like member.

5. Apparatus according to claim 3 in which said means for mounting said auxiliary twister head on said shaft includes a nut fastened to the end of said shaft adjacent said auxiliary twister head, said nut having a plurality of threaded radial holes therein, a holder having a portion thereof snugly surrounding said nut, said portion of said holder having a plurality of slots therethrough each in alignment with one of said threaded radial holes, a capscrew extending through each of said slots into the associated threaded hole to hold said holder in adjusted position on said nut, said holder having a plurality of holes therein parallel to the axis thereof, said plate like member having a plurality of holes therein parallel to the axis thereof aligned with the holes in said holder, a plurality of bars extending between said holder and plate like member with the ends thereof being received in said aligned holes, and means securing said bars to said holder and plate like member.

6. The method of making a wire rope having an independent wire rope core, including a plurality of strands surrounding a core, and a plurality of outer strands surrounding the independent wire rope core, which method cormprises forming an independent wire rope core with a lay equal to that of said outer strands around the independent wire rope core, unlaying the strands of the independent wire rope core from around its core, and then stranding the outer strands and the strands of the independent wire rope core around said core at a common point of twist.

7. The method of making a wire rope having an independent wire rope core, including a plurality of strands surrounding a core, and a plurality of outer strands surrounding the independent wire rope core, which method comprises forming an independent wire rope core with a lay equal to that of said outer strands around the independent wire rope core, feeding said independent wire rope core axially, unlaying the strands of the independent wire rope core from around its core as it is fed axially, guiding the outer strands around the unlaid strands of the independent wire rope core, and then stranding the outer strands and the strands of the independent wire rope core around said core at a common point of twist with the outer strands being received in the grooves between the strands of the independent wire rope core.

References Cited by the Examiner

UNITED STATES PATENTS

| | | | |
|---|---|---|---|
| 2,019,519 | 11/1935 | Wood | 57—3.5 |
| 2,484,055 | 10/1949 | Shepard | 57—3.5 |
| 2,556,164 | 6/1951 | Carleton et al. | 57—145 X |

FRANK J. COHEN, *Primary Examiner.*

W. S. BURDEN, *Assistant Examiner.*